Patented Mar. 12, 1935

1,994,035

UNITED STATES PATENT OFFICE 1,994,035

HALOGENATED DERIVATIVES OF ALIPHATIC HYDROCARBONS

Carlton W. Croco, Woodstown, N. J., assignor to Kinetic Chemicals Inc., Wilmington, Del., a corporation of Delaware No Drawing. Application August 18, 1932, Serial No. 629,311

19 Claims. (Cl. 260—162)

This invention relates to halogenated aliphatic hydrocarbons, more particularly fluorinated aliphatic hydrocarbons, and a process for the production thereof.

It is an object of the invention to provide a new and improved process for producing halogenated aliphatic hydrocarbons. A further object is to provide a new and improved process for producing fluorinated aliphatic hydrocarbons. Another object is the provision of a method for converting halogen derivatives of aliphatic hydrocarbons to different halogen derivatives of the same hydrocarbon, at least one of which contains more fluorine, and at least one of which contains less fluorine than the original material. A still further and more specific object is the provision of a process for the simultaneous formation and production of poly-fluoro derivatives and of fluorine free derivatives of methane from mono-fluoro derivatives of methane which also contain halogens other than fluorine. Another object is the production of difluoro-dichloro-methane from fluoro-trichloro-methane. Other objects will appear hereinafter.

These objects are accomplished according to the broader aspects of the invention by reacting halogenated hydrocarbons such as, for example, halogenated methanes containing at least one fluorine atom and at least one other halogen atom, with an aluminum halide containing a halogen other than fluorine. By this procedure it has been found that halogen substituted methanes containing fluorine may be converted to different halogen derivatives of methane, at least one of which contains more fluorine and at least one of which contains less fluorine than the original halogenated methane.

While the invention is susceptible of considerable variation and modification in the manner of its practical application, particularly as regards proportions of materials and the exact method of procedure, the following examples, in which the parts are by weight, will serve to illustrate how the invention may be practiced.

Example I

About 130 parts of fluoro-trichloro-methane were added to a vessel provided with a reflux condenser maintained at a temperature of about 0° C. Twenty parts of anhydrous aluminum bromide were then added and the charge allowed to warm up to about 23.6° C., the boiling point of fluoro-trichloro-methane. A reaction took place upon adding the aluminum bromide and vapors started to pass through the reflux condenser. During a period of about 4 hours the reaction mixture was maintained at its boiling temperature, which gradually rose to about 45° C. at which point the operation was discontinued.

The vapors from the reflux condenser passed to a second condenser which was maintained at a temperature of about —50° C. by means of a suitable refrigerant such as, for example, solid carbon dioxide. In this second condenser substantially complete liquefaction of the vapors resulted. About 50 parts of condensate were obtained consisting primarily of difluoro-dichloro-methane (B. P. —29° C.). This condensate also contained some fluoro-trichloro-methane and small quantities of trifluoro-chloro-methane. The liquid which remained in the reaction vessel consisted essentially of a mixture of carbon tetrachloride (B. P. 76° C.) and fluoro-trichloro-methane. These two components recovered by fractional distillation.

Example II

To a vessel similar in principle to that described in Example I, there were added about 90 parts of fluoro-dichloro-methane and subsequently 4 parts of anhydrous aluminum chloride. The reflux condenser was maintained at about —10° C. and the final condenser was held at about —50° C. The temperature of the charge was maintained at the boiling point (8.7° C.) of fluoro-dichloro-methane for two hours. Subsequently, the charge was maintained at its refluxing temperature for three hours. This temperature gradually rose to 25° C. before the operation was discontinued.

The vapors evolved from the reaction liquid were liquefied in the final condenser and about 30 parts of condensate obtained. This condensate contained approximately equal proportions of difluoro-chloro-methane (B. P.—39° C.) and fluoro-dichloro-methane. The liquid in the reaction vessel contained approximately 35% chloroform and 65% fluoro-dichloro-methane which were recovered by fractional distillation.

The treatment of fluorinated aliphatic hydrocarbons with aluminum halide may be applied to other fluorinated aliphatic hydrocarbons but, as will be recognized, the results obtained may vary widely depending largely upon the nature of the original material and the conditions of reaction. Especially desirable results have been obtained in the treatment of mono-fluorochloro and mono-fluoro-bromo derivatives of methane.

The proportions of aluminum halide may vary within relatively wide limits. In general, relatively small amounts of the aluminum halide are preferably employed. Very desirable results are obtained when the amount of aluminum halide corresponds to about 0.5% to 10% by weight of the reaction mixture.

While the invention is not limited to any theory as regards the mechanism of the reaction, it appears that the aluminum halide present in the reaction mixture may be in an activated form and may have a different composition from that of the original salt. It is probable that there may be formed a complex of the type,

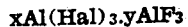
$$xAl(Hal)_3 \cdot yAlF_3$$

in which Hal represents a halogen other than fluorine and $x$ and $y$ represent the number of moles of the constituents. Evidence of such a change was indicated by changes in the appearance of the aluminum halide added to the reaction mixture.

The aluminum halide may be added in any suitable form, for example, as such or on a support such as alundum or pumice.

The temperature of the reaction may be varied over a relatively wide range but should preferably be below the temperature at which the reactants and the products decompose. Generally speaking, it is preferable to adjust the temperature conditions of the reaction mass and of the reflux condenser so as to remove the desired volatile products and vapors and to maintain the starting materials and less volatile products in contact with the aluminum halide. If desired, the reflux may be maintained by the use of a fractionation column. Pressures above, as well as below, that of the atmosphere may be employed.

It will be understood that the aluminum halides may be used in conjunction with other processes employed in the production of fluorinated compounds of the character herein described.

A particular advantage of the present process is that it is adapted to the production of a number of valuable poly-fluoro aliphatic hydrocarbons from less valuable derivatives which contain less fluorine. It has been found to be especially desirable for the production of poly fluoro derivatives of methane, particularly chloro- (or bromo) poly-fluoro-methane derivatives from mono-fluoro-poly-chloro (or bromo) methane derivatives.

As many apparently widely different embodiments of this invention may be made without departing from the spirit and scope thereof, it is to be understood that I do not limit myself to the specific embodiments thereof except as defined in the appended claims.

I claim:

1. In a process of producing fluorinated aliphatic hydrocarbons, the step which comprises reacting a halogenated methane containing fluorine and another halogen with an aluminum halide containing a halogen other than fluorine.

2. In a process of producing halogenated methanes the step which comprises converting a fluorinated methane containing one or more other halogen atoms to different halogen derivatives of methane, at least one of which contains more fluorine and at least one of which contains less fluorine than the original fluorinated methane, by reacting said original fluorinated methane with an aluminum halide containing a halogen other than fluorine.

3. The process of claim 2 in which the aluminum halide is aluminum bromide.

4. In a process of producing halogenated methanes, the step which comprises converting a halogen substituted methane containing fluorine and another halogen to different halogen derivatives of methane, at least one of which contains more fluorine and at least one of which contains less fluorine than said original halogenated methane, by reacting said original halogenated methane with aluminum chloride.

5. In a process of producing fluorinated aliphatic hydrocarbons, the step which comprises reacting a halogenated methane containing one fluorine atom and at least one other halogen atom with an aluminum halide containing a halogen other than fluorine.

6. The process of claim 5 in which the aluminum halide is aluminum bromide.

7. In a process of producing fluorinated aliphatic hydrocarbons, the step which comprises reacting a halogenated methane containing one fluorine atom and at least one other halogen atom with aluminum chloride.

8. In a process of producing difluoro-dichloro-methane, the step which comprises contacting fluoro-trichloro-methane with an aluminum halide containing a halogen other than fluorine.

9. In a process of producing difluoro-dichloro-methane, the step which comprises vaporizing the product formed by adding an aluminum halide containing a halogen other than fluorine to fluoro-trichloro-methane.

10. In a process of producing difluoro-dichloro-methane, the step which comprises maintaining a mixture formed from fluoro-trichloro-methane and a relatively small amount of an aluminum halide containing a halogen other than fluorine at about the boiling temperature of the mixture under atmospheric pressure.

11. In a process of producing difluoro-dichloro-methane, the steps which include introducing a relatively small amount of an aluminum halide containing halogen other than fluorine into fluoro-trichloro-methane, and maintaining the resultant product at about the boiling temperature.

12. The process of producing difluoro-dichloro-methane and carbon tetrachloride, which comprises introducing about 20 parts of aluminum chloride into about 130 parts of fluoro-trichloro-methane, maintaining the resultant product at about the boiling temperature under atmospheric pressure until said temperature is about 45° C., condensing the evolved vapors, separating difluoro-dichloro-methane from the condensate, and recovering carbon tetrachloride from the residual reaction liquid.

13. The process of producing difluoro-dichloro-methane and carbon tetrachloride which comprises introducing a relatively small amount of aluminum chloride into fluoro-trichloro-methane, maintaining the resultant product at about the boiling temperature under atmospheric pressure until said temperature is about 45° C., condensing the evolved vapors, separating difluoro-dichloro-methane from the condensate, and recovering carbon tetrachloride from the residual reaction liquid.

14. The process of producing difluoro-dichloro-methane which comprises maintaining a mixture formed from fluoro-trichloro-methane and a relatively small amount of aluminum chloride at about the boiling temperature of the mixture under atmospheric pressure, and separating difluoro-dichloro-methane from the evolved vapors.

15. A complex aluminum salt of the type $$xAl(Hal)_3 \cdot yAlF_3$$

where Hal is a halogen other than fluorine, and $x$ and $y$ represent positive values, said complex salt being obtainable by reacting an aluminum halide containing a halogen other than fluorine with a fluorinated hydrocarbon.

16. In a process of producing difluoro-chloromethane, the step which comprises reacting fluoro-dichloro-methane with an aluminum halide containing a halogen other than fluorine.

17. The process of claim 16 in which the aluminum halide is aluminum chloride.

18. The process of claim 16 in which the aluminum halide is aluminum bromide.

19. In a process of producing halogenated methane derivatives, the step which comprises reacting a complex aluminum salt, most probably having the general formula $$xAl(Hal)_3 \cdot yAlF_3$$

where Hal is a halogen other than fluorine, and $x$ and $y$ represent positive values, with a halogenated methane containing fluorine, said complex salt being obtainable by reacting an aluminum halide containing a halogen other than fluorine with a fluoro-chloro-methane.

CARLTON W. CROCO.